United States Patent
Emery et al.

(10) Patent No.: US 11,308,698 B2
(45) Date of Patent: Apr. 19, 2022

(54) USING DEEP LEARNING TO DETERMINE GAZE

(71) Applicant: Facebook Technologies, LLC, Menlo Park, CA (US)

(72) Inventors: Kara Emery, Redmond, WA (US); Marina Zannoli, Redmond, WA (US); Lei Xiao, Redmond, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 13 days.

(21) Appl. No.: 16/705,221

(22) Filed: Dec. 5, 2019

(65) Prior Publication Data

US 2021/0174589 A1 Jun. 10, 2021

(51) Int. Cl.
| | |
|---|---|
| *G06T 19/00* | (2011.01) |
| *G06N 20/00* | (2019.01) |
| *G02B 27/01* | (2006.01) |
| *G06F 3/01* | (2006.01) |
| *G06F 3/04815* | (2022.01) |
| *G06K 9/62* | (2022.01) |

(52) U.S. Cl.
CPC .......... *G06T 19/006* (2013.01); *G02B 27/017* (2013.01); *G06F 3/014* (2013.01); *G06F 3/04815* (2013.01); *G06K 9/6202* (2013.01); *G06K 9/6232* (2013.01); *G06N 20/00* (2019.01); *G02B 2027/014* (2013.01); *G02B 2027/0187* (2013.01)

(58) Field of Classification Search
None
See application file for complete search history.

(56) References Cited

U.S. PATENT DOCUMENTS

| | | |
|---|---|---|
| 2002/0005862 A1 | 1/2002 | Deering |
| 2010/0082397 A1* | 4/2010 | Blegen ............... G06Q 30/0261 705/14.58 |
| 2013/0144616 A1* | 6/2013 | Bangalore ............. G10L 15/197 704/226 |

(Continued)

FOREIGN PATENT DOCUMENTS

EP 3422296 A1 1/2019

OTHER PUBLICATIONS

International Search Report and Written Opinion for International Application No. PCT/US2020/061715, dated Mar. 10, 2021.

*Primary Examiner* — David H Chu
(74) *Attorney, Agent, or Firm* — Baker Botts L.L.P.

(57) ABSTRACT

In one embodiment, a computing system may generate and display a virtual reality environment to a user. The computing system may determine a head pose of the user based on headset tracking data associated with a headset worn by the user. The computing system may determine a hand pose of the user based on hand tracking data associated with a device held or worn by a hand of the user. The computing system may access scene information associated with the displayed virtual reality environment. The computing system may determine a predicted focal point of the user within the virtual reality environment by processing the head pose, the hand pose, and the scene information using a machine-learning model.

20 Claims, 6 Drawing Sheets
(3 of 6 Drawing Sheet(s) Filed in Color)

(56) References Cited

U.S. PATENT DOCUMENTS

| | | | |
|---|---|---|---|
| 2015/0339589 A1* | 11/2015 | Fisher | B25J 9/16 |
| | | | 706/12 |
| 2016/0019718 A1* | 1/2016 | Mukkamala | G06F 3/012 |
| | | | 345/419 |
| 2016/0131902 A1* | 5/2016 | Ambrus | G02B 27/0093 |
| | | | 345/156 |
| 2016/0133055 A1 | 5/2016 | Fateh | |
| 2017/0212582 A1* | 7/2017 | Oledal | G06F 3/04842 |
| 2017/0220134 A1* | 8/2017 | Burns | G06F 3/04812 |
| 2018/0009442 A1* | 1/2018 | Spasojevic | A61B 3/112 |
| 2018/0070816 A1* | 3/2018 | Byrns | A61B 5/11 |
| 2018/0096507 A1 | 4/2018 | Valdivia | |
| 2018/0227630 A1 | 8/2018 | Schmidt | |
| 2019/0235729 A1* | 8/2019 | Day | G06F 3/04812 |
| 2019/0237044 A1* | 8/2019 | Day | G06F 3/04812 |
| 2019/0362557 A1* | 11/2019 | Lacey | G06F 3/012 |
| 2020/0097076 A1* | 3/2020 | Alcaide | G02B 27/0093 |
| 2020/0103980 A1* | 4/2020 | Katz | G06F 3/167 |
| 2020/0327740 A1* | 10/2020 | Frommhold | G06T 15/405 |
| 2021/0042581 A1* | 2/2021 | Kursun | G06N 20/00 |

\* cited by examiner

USING DEEP LEARNING TO DETERMINE GAZE

TECHNICAL FIELD

This disclosure generally relates to controls and interfaces for user interactions and experiences in a virtual reality environment.

BACKGROUND

Virtual reality is a computer-generated simulation of an environment (e.g., a 3D environment) that users can interact with in a seemingly real or physical way. A virtual reality system, which may be a single device or a group of devices, may generate this simulation for display to a user, for example, on a virtual reality headset or some other display device. The simulation may include images, sounds, haptic feedback, and/or other sensations to imitate a real or imaginary environment. As virtual reality becomes more and more prominent, its range of useful applications is rapidly broadening. The most common applications of virtual reality involve games or other interactive content, but other applications such as the viewing of visual media items (e.g., photos, videos) for entertainment or training purposes are close behind. The feasibility of using virtual reality to simulate real-life conversations and other user interactions is also being explored.

SUMMARY OF PARTICULAR EMBODIMENTS

Disclosed herein are a variety of different ways of rendering and interacting with a virtual (or augmented) reality environment. A virtual reality system may render a virtual environment, which may include a virtual space that is rendered for display to one or more users. The users may view and interact within this virtual space and the broader virtual environment through any suitable means. One goal of the disclosed methods is to determine a user's gaze or perform eye tracking. In particular embodiments, the virtual reality system may provide a method of determining a user's gaze through using a machine-learning model. The virtual reality system may use input data, such as a pose of a headset the user is wearing with respect to the environment, a pose of a controller with respect to headset or environment, scene information, among other data, in order to determine a user's gaze. By training a machine-learning model to determine the gaze, the virtual reality system may improve the accuracy of a predicted gaze of the user. Currently, a virtual reality system requires sensors, such as an eye tracker, in order to determine a gaze of the user. As such, virtual reality systems that don't have the necessary sensors may be unable to utilize varifocal displays and gaze-contingent rendering solutions that improve upon the visual experience of the user and the processing of the virtual reality system. To train the machine-learning model, the machine-learning model may utilize the input data with data from eye trackers for the ground truth data. After the machine-learning model is trained, then the machine-learning model may be implemented in virtual reality systems that don't have eye trackers to enable these virtual reality systems to have the ability to perform eye tracking and/or determine a user's gaze.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXAMPLE EMBODIMENTS

Figure 1:
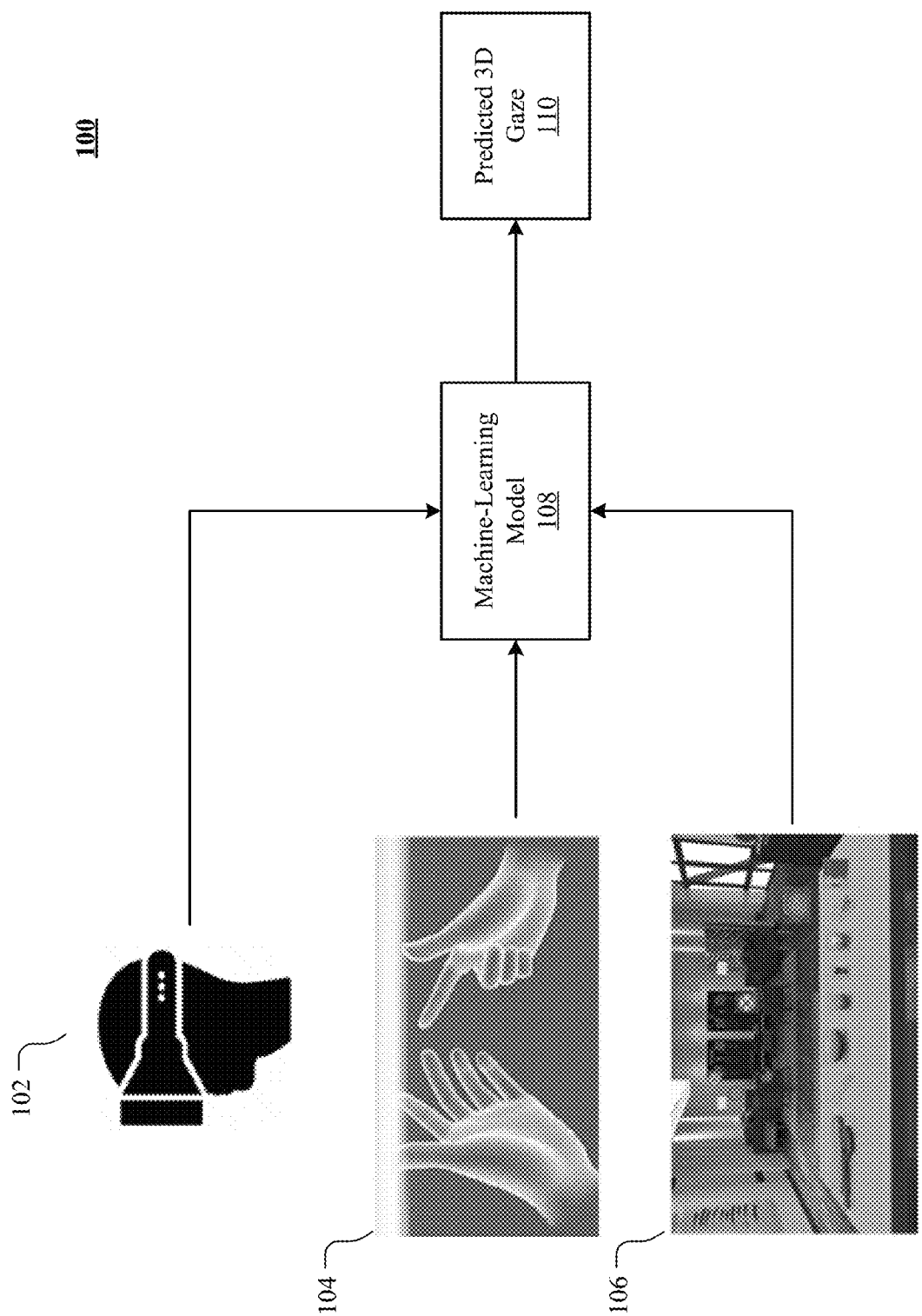
FIG. 1 illustrates an example process of using a machine-learning model to determine a user's gaze.

Many of the technologies for developing a high-quality visual experience on a portable, personal display may rely on accurate gaze tracking. The gaze-contingent technology that may help to improve a user's visual experience within a virtual reality environment may include varifocal displays and foveated rendering. While some virtual reality systems may include eye trackers in order to determine a user's gaze, eye trackers are accessible to all virtual reality systems. For instance, a user who is rendering a virtual reality environment through the user's smartphone may not have eye tracking capabilities. As virtual reality becomes more accessible to users through portable and personal solutions, such as a user's smartphone, the eye tracking/gaze determining functionality will be removed. However, through training a machine-learning model, data available for most virtual reality systems may be utilized in order to determine a user's gaze and/or perform eye tracking. As users explore a virtual reality environment and complete tasks, the position of their gaze may correspond with sources of information, such as head direction, hand location, the content of the scene, and the goal of a task. While an eye tracking/gaze determining process and application may be described herein in context of a virtual reality system and virtual reality environment, the process and application may also apply to augmented reality systems, augmented reality environments, mixed reality systems, and mixed reality environments. As an example and not by way of limitation, the rendered environment may be an augmented reality environment comprising a real-world scene with augmented reality elements, and the input data may be data used by an augmented reality system to determine a user's gaze.

In particular embodiments, in order to train a machine-learning model to determine gaze, input data associated with at least one of a pose of the headset, controller information, and scene information may be used. In particular embodiments, the virtual reality system may retrieve or access the input data from a plurality of sensors. As an example and not by way of limitation, the virtual reality system may determine an acceleration of a headset through an accelerometer coupled to the headset. The input data may be used to determine a predicted focal point of where the user is looking. The predicted focal point may be represented by a three-dimensional coordinate within an environment of the user. For example, the predicted focal point may be represented by an XYZ coordinate within an environment of the user. For instance, within a virtual reality environment, the AR/VR headset may calculate a predicted three-dimensional coordinate to represent where the user is looking within the virtual reality environment. The pose of the headset may indicate a position and orientation of the headset. This position and orientation may be with respect to the environment. The input data may also include a velocity and an acceleration of the headset. The controller information may indicate pose data associated with one or more of the controllers with respect to the headset and the environment and also if there are actions being performed with respect to the controllers (e.g., user is holding down a button to perform a pick-up function). The controller information may also include a velocity and an acceleration of each of the controllers. The scene information may include RGBD data of the environment. The headset may perform object identification from the RGBD data of the scene. In a virtual reality environment, the virtual reality system may receive additional information related to the virtual reality environment. For example, object data of objects in the virtual scene, game information, and additional information of the virtual environment may be sent to the virtual reality system. The information of the environment may be used to predict where the user may be looking. As an example and not by way of limitation, if there is a target a user needs to aim for, then it's highly likely the user will be looking at the target. This accumulation of information about the pose of the headset, controller information, and scene information may be fed into the machine-learning model to predict a focal point of the user. In particular embodiments, the predicted focal point may be compared to a ground truth of the actual gaze of the user. In particular embodiments, the actual gaze may be initially determined by eye tracking sensors and user confirmation. After the machine-learning model is trained, other virtual reality systems that don't have eye tracking sensors may use the machine-learning model in order to predict a focal point of the user.

In particular embodiments, the output of the machine-learning model may be a confidence map of where the focal point may be located. The confidence map may include confidence scores of various XYZ locations within an environment. This may be similar to a heat map of where the focal point may be located. As an example and not by way of limitation, the confidence map may include a range from 0-1 for multiple XYZ locations within an environment. In particular embodiments, the confidence score may represent a probability the focal point is at the location. In particular embodiments, the predicted focal point may comprise several XYZ locations. While discussed as an XYZ focal point, the machine-learning model may determine just an XY focal point to indicate a gaze trajectory rather than a particular focal point in 3D space.

In particular embodiments, the virtual reality system may generate and display a virtual reality environment to a user. The virtual reality system may comprise a headset, one or more controllers, a processor, and additional sensors (e.g., cameras, etc.). In particular embodiments, the headset and the processor may be contained within one computing device. The virtual reality headset may render a virtual reality environment, such as an application to be displayed on the virtual reality headset. The application may be associated with a category and/or subcategory. As an example and not by way of limitation, the application may be a game, and the game may be a sports game. The virtual reality system may access or retrieve information corresponding to the application associated with a rendered virtual reality environment. As an example and not by way of limitation, if the virtual reality headset generates a virtual reality element (e.g., a book), then the virtual reality system may retrieve that information to identify various objects within the virtual reality environment. In particular embodiments, the virtual reality system may perform object detection within the virtual reality environment.

In particular embodiments, the virtual reality system may determine a head pose of the user. In particular embodiments, the virtual reality system may determine the head pose based on headset tracking data associated with a headset worn by the user. In particular embodiments, the virtual reality system may access sensor data (e.g., accelerometer/gyroscope data of headset, or separate camera monitoring user within virtual reality environment) to track the pose of the headset. As an example and not by way of limitation, the headset may have IR/LED patterns that could be detected by stand-alone sensors to be used to determine the pose of the headset. As another example and not by way of limitation, the headset may have external-facing cameras, which may take pictures of the physical environment and use triangulation techniques to determine where the headset is relative to the physical environment. The position of the headset relative to the physical environment may be compared to the user's pose within a virtual reality environment. In particular embodiments, the head pose may be determined with respect to the virtual reality environment.

In particular embodiments, the virtual reality system may determine a hand pose of the user. In particular embodiments the virtual reality system may determine the hand pose based on the hand tracking data associated with a device held or worn by a hand of the user. As an example and not by way of limitation, the device may be a controller, a glove, etc. In particular embodiments, the virtual reality system may determine the hand pose based on hand tracking data of the hand of the user. In particular embodiments, similarly to determining the head pose, the virtual reality system may determine the pose of the device in the user's hand based on sensor data. As an example and not by way of limitation, the virtual reality system may use IR/LED patterns to determine the pose of the device (e.g., controller) in the user's hand. As another example and not by way of limitation, the headset may capture images of the controller and determine a hand pose of the device relative to the user's headset. As another example and not by way of limitation, the headset may capture images of the hand of the user and determine a hand pose of the hand of the user. In particular embodiments, the hand pose may be determined with respect to the virtual reality environment or the physical real-world environment. In particular embodiments, the virtual reality system may also access controller information of the device in the user's hand. The controller information may indicate an action being performed by the device. As an example and not by way of limitation, the user may click on a button of the device, which may correspond to an action within the virtual reality environment. For instance, the action may be to hold an object, interact with the object, and the like. In particular embodiments, the headset may determine gestures being performed by one or both hands of the user through captured images of the environment that include the hands of the user.

In particular embodiments, the virtual reality system may access scene information associated with the displayed virtual reality environment. In particular embodiments, the virtual reality system may retrieve the scene information that is provided by an application. As an example and not by way of limitation, if the application is a game and the game instructs the headset to generate virtual reality elements within the virtual reality environment, the virtual reality system may be able to retrieve the information corresponding to the virtual reality elements. For instance, the virtual reality system may determine an XYZ coordinate corresponding to the virtual reality elements that are generated within the virtual reality environment. In particular embodiments, the scene information may include color and depth data. In particular embodiments, the virtual reality system may access the one or more of RGB data or RGBD data associated with a virtual reality environment. As an example and not by way of limitation, the virtual reality system may capture images within the virtual reality environment. In particular embodiments, within an augmented reality context or a mixed reality context, a headset may capture images of the real-world environment. The captured images of the real-world environment may be processed to identify physical objects within the real-world environment. The images may be processed by applying triangulation techniques to determine depth measurements of the physical objects. In particular embodiments, the scene information may include semantic information of the virtual reality elements within the virtual reality environment. The virtual reality system may perform object detection using various techniques to identify the objects within the virtual reality environment. The virtual reality environment may determine an XYZ coordinate and/or location of the object with respect to the virtual reality environment. In particular embodiments, the scene information may be classified as low-level information and high-level information. The low-level information may include one or more of an intensity, a color, or a motion. The high-level information may include identified faces in the virtual reality environment, identified humans within the virtual reality environment, and an identified task. As an example and not by way of limitation, the virtual reality system may determine a user is attempting to pick up an object within the virtual reality environment, firing a weapon within the virtual reality environment, and the other possible tasks the user may be doing within the virtual reality environment.

In particular embodiments, the virtual reality system may determine a predicted focal point of the user. In particular embodiments, the virtual reality system may determine the predicted focal point of the user by processing the head pose, the hand pose, and the scene information using a machine-learning model. While the machine-learning model is described as being trained to be applied to a virtual reality environment by a virtual reality system, the machine-learning model may also be trained to be applied to an augmented reality environment by an augmented reality system or be trained to be applied to a mixed reality environment by a mixed reality system. In particular embodiments, the virtual reality system may use other data to process using a machine-learning model. As an example and not by way of limitation, the virtual reality system may process the action being performed by the device held or worn by a hand of the user using the machine-learning model. For instance, if the user is attempting to pick up an object, the machine-learning model may determine a predicted focal point is towards the object that is being picked up. In particular embodiments, the predicted focal point may be a three-dimensional coordinate within the virtual reality environment. In particular embodiments, the virtual reality system may generate a confidence map and determine a predicted focal point by using the confidence map. The predicted focal point may be determined without the use of eye tracking sensors. While determining a predicted focal point is discussed, the virtual reality system may use a machine-learning model to determine a user eye accommodation and/or vergence using the input data as described herein.

In particular embodiments, the virtual reality system may access one or more of previous frame data or previous frame prediction results to determine a predicted focal point and other outputs of the machine-learning model. In particular embodiments, the machine-learning model may analyze the temporal correlation between each frame displayed to the user. As an example and not by way of limitation, a predicted focal point within one frame may be determined to be in the exact location or relatively close to a predicted focal point of a previous frame. In particular embodiments, the previous frame data may comprise the input data of the respective frame. As an example and not by way of limitation, within a sequence of frames displayed to the user, the virtual reality system may access a singular frame and its corresponding input data. In particular embodiments, the previous frame prediction results may comprise a previous predicted focal point and other outputs of the machine-learning model. The previous frame prediction results may indicate a current predicted focal point. The machine-learning model may be trained to use to previous frame data and/or previous frame prediction results to determine a current predicted focal point.

In particular embodiments, the virtual reality system may adjust an image presented to the user. In particular embodiments, the virtual reality system may adjust the image presented to the user based on the predicted focal point of the user within the virtual reality environment. The virtual reality system may adjust the image presented to the user based on other data, such as a determined user eye accommodation and/or determined vergence. As an example and not by way of limitation, the virtual reality system may use the predicted focal point for foveated rendering to reduce the processing required to display the virtual reality environment. With foveated rendering, the virtual reality system may reduce any unnecessary rendering outside of the predicted focal point. In particular embodiments, the determination of a predicted focal point may help with image distortion correction, any necessary image shifts, and the like. Additionally, the predicted focal point may help with foveated rendering to reduce unnecessary rendering outside of the predicted focal point. The predicted focal point may also be used for varifocal displays to adjust focal displays based on the predicted focal point. In particular embodiments, the virtual reality system may continuously determine a predicted focal point of the user and adjust the image presented to the user based on an updated predicted focal point. While a virtual reality environment and a virtual reality system is described herein, in particular embodiments, the predicted focal point and other outputs of the machine-learning model (e.g., a user eye accommodation and/or vergence) may be used by an augmented reality system for an augmented reality environment or by a mixed reality system for a mixed reality environment.

In particular embodiments, the user may interact within a rendered environment by one or more of an augmented reality system, a virtual reality system, or a mixed reality system. The rendered environment may be an augmented reality environment, a virtual reality environment, or a mixed reality environment. In particular embodiments, one or more of an augmented reality system, a virtual reality system, or a mixed reality system may take the input data described herein to train a machine-learning model to determine a user's gaze or perform eye tracking. As an example and not by way of limitation, the augmented reality system may access input data from sensors coupled to a headset worn by the user. In particular embodiments, an augmented reality system or a mixed reality system may use the machine-learning model to determine a user's gaze or perform eye tracking. In particular embodiments, the augmented reality system or mixed reality system may use the determined user's gaze for one or more of varifocal lens, improved eye tracking, or user interface interaction. As an example and not by way of limitation, lens of an augmented reality system may be adjusted based on the determined gaze of the user. In particular embodiments, low-fi eye trackers may be used by an augmented reality system, a virtual reality system, or a mixed reality system and the determined user's gaze may improve upon the results of the determined user's gaze.

In particular embodiments, a user may interact with a user interface through the user's gaze. In particular embodiments, user interface elements may be generated as augmented reality elements, virtual reality elements, or mixed reality elements. The user may perform a function associated with the user interface by directing their gaze at the corresponding rendered element. As an example and not by way of limitation, a messaging icon (that may be coupled to a view of the user, such as a corner of the user's view, or coupled to the rendered environment) may be rendered as an augmented reality element within the augmented reality environment presented to the user. If the augmented reality system determines the user is attempting to look at the messaging icon, then the augmented reality system may activate a messaging application for the user to interact. In particular embodiments, the determined gaze may be used to navigate through a user interface. As an example and not by way of limitation, the user may scroll up or down on a menu presented to the user (a menu coupled to the view of the user or to rendered environment) by looking up or down within respect to a specific point. In particular embodiments, the determined gaze may be used to perform a selection within a user interface. As an example and not by way of limitation, if a user is presented a plurality of options within as augmented reality elements (that may be coupled to the user's view or the augmented reality environment) the user may select one of the options by looking at the augmented reality element that corresponds to the option. In particular embodiments, the user's gaze may be used in conjunction with a gesture (e.g., a user pointing at an augmented reality element) to determine what option the user selects.

In particular embodiments, a machine-learning model may develop personalized gaze profiles. As an example and not by way of limitation, a user may sign into an account (e.g., a social-networking account) on a virtual reality system that links the account to the virtual reality system. The machine-learning model may be trained to determine the gaze of the specific user based on user interaction with the virtual reality environment. As an example and not by way of limitation, the user may look at a virtual reality environment in a slightly different way than most users and the machine-learning model may accurately determine the specific user's gaze. The machine-learning model may also be trained to determine the gaze of the specific user based on eye tracking sensors (e.g., if the device has them). In particular embodiments, if the user signs into their account on another virtual reality system or device (e.g., an augmented reality system or mixed reality system) the personalized gaze profile may be used by the machine-learning model to determine the user's gaze. In particular embodiments, the personalized gaze profile may be a machine-learning model trained for a particular user.

Referring to FIG. 1, an example process 100 of using a machine-learning model to determine a user's gaze is shown. In particular embodiments, the process 100 may include receiving input data 102, 104, 106 at a virtual reality system or other processing device. In particular embodiments, the input data may include headset tracking data 102, hand tracking data 104, and scene information 106. In particular embodiments, the headset tracking data 102 may include sensor data from a virtual reality headset of a virtual reality system or sensor data from a stand-alone sensor of the virtual reality system. The headset tracking data 102 may be used to determine a head pose of the user. The head pose may indicate a position and orientation of the virtual reality headset with respect to the virtual reality environment or with respect to a physical environment. In particular embodiments, the hand tracking data 104 may include sensor data from a virtual reality controller of a virtual reality system or sensor data from a stand-alone sensor of the virtual reality system. The hand tracking data 104 may be used to determine a hand pose of the user. The hand pose may indicate a position and orientation of the virtual reality controller with respect to the virtual reality environment or the virtual reality headset. In particular embodiments, the scene information 106 may be retrieved from an application (e.g., current application executing on the virtual reality system to generate virtual reality environment) or determined based on data of the virtual reality environment (e.g., RGBD data). In particular embodiments, the scene information 106 may indicate semantic information of virtual reality elements in the virtual reality environment as well as a three-dimensional coordinate associated with each virtual reality element. The scene information 106 may also indicate other information, such as color and depth data associated with the virtual reality environment. The scene information 106 may include a task that the user is completing within the virtual reality environment.

In particular embodiments, the input data 102, 104, 106 may be passed to a machine-learning model 108 that determines a predicted three-dimensional gaze 110. In particular embodiments, the machine-learning model 108 may have been previously trained by comparing predicted gazes with a ground truth. In particular embodiments, the machine-learning model may determine that certain tasks may lead to the user looking at a particular point in the virtual reality environment. For instance, if a user is cooking within a virtual reality environment, the virtual reality system may send the scene information 106 to the machine-learning model 108 along with the other input data 102, 104. The machine-learning model 108 may determine that since the user is cooking, the user has to look at certain objects within the virtual reality environment, such as cooking utensils and the like. This information may be used to predict a focal point 110 of where the user is looking because users may typically follow the same gaze patterns as they perform the same or similar tasks. In particular embodiments, additional information, such as the category and/or subcategory of an application may be used to determine a predicted focal point 110. As an example and not by way of limitation, the category of the application (e.g., sports game) may indicate certain actions and subsequent gaze patterns users may typically follow while performing actions associated with the category. The categorization of these actions may train the machine-learning model to identify gaze patterns corresponding to specific categories of applications. Additionally, in particular embodiments, the machine-learning model may more specifically determine gaze patterns associated with certain actions the user performs within a virtual reality environment.

In particular embodiments, the machine-learning model may identify relationships between objects within a virtual reality environment. As an example and not by way of limitation, if a user is performing a cooking action, such as making a peanut butter and jelly sandwich, then the machine-learning model may identify objects that would be used for the action and a sequence of events the user would follow in order to complete the task of making the sandwich. The sequence of events may indicate a gaze pattern of where the user will look while making the sandwich. For instance, the user may start by grabbing the bread or a utensil. As such, the user may initially look at the bread and follow the process.

Figure 2:
FIG. 2 illustrates an example virtual reality environment where a predicted gaze is determined.

FIG. 2 illustrates an example virtual reality environment 200 where a predicted gaze is determined. The virtual reality environment 200 may comprise a plurality of objects 202. For instance, one of the objects 202 may be a clipboard 202a. The virtual reality environment 200 may display a user's hand 204 within the virtual reality environment 200. In particular embodiments, the user's hand 204 may correspond to a virtual reality controller the user is holding. In particular embodiments, the virtual reality system may determine a head pose and hand pose based on sensor data as described herein. The head pose may indicate the position of the user's head and orientation within the virtual reality environment 200. The hand pose may indicate a user's hand position and orientation within the virtual reality environment 200. The virtual reality system may access scene information of the virtual reality environment. The scene information may identify the various objects 202 within the virtual reality environment 200 as well as the positions of the objects 202 within the virtual reality environment. The scene information may indicate a task that the user is doing, for example, the user is picking up a clipboard 202a with instructions. As such, the user may be reading the clipboard 202a. The virtual reality system may process the determined head pose, determined hand pose, and scene information using a machine-learning model to determine a predicted focal point 206 representing the predicted gaze of the user. The machine-learning model may determine that since the user is reading the clipboard 202a, the predicted focal point 206 may be located on or near the clipboard 202a. In particular embodiments, the virtual reality system may alter a display of the virtual reality environment 200 based on the predicted gaze.

Figure 3:
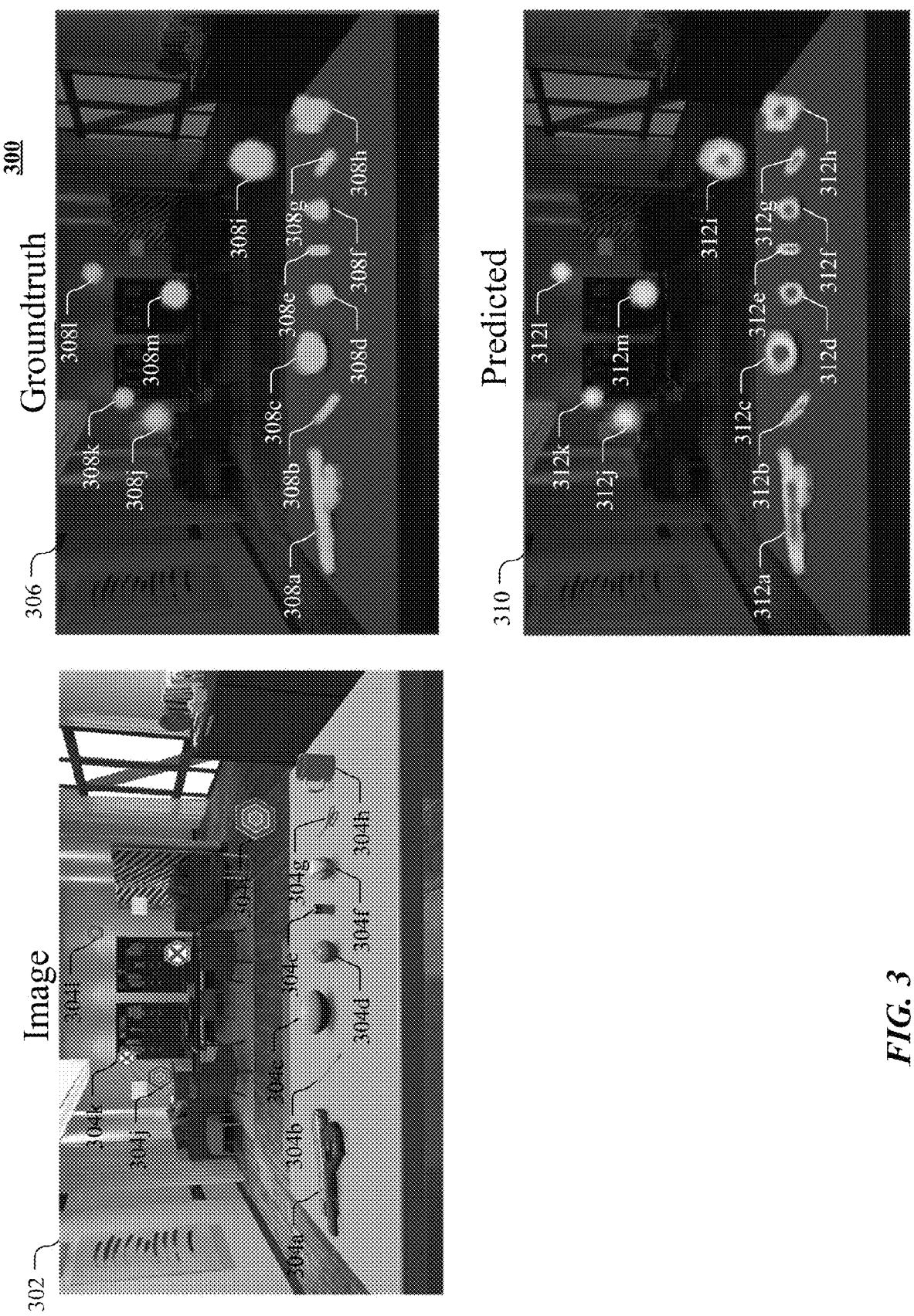
FIG. 3 illustrates an example process of training a machine-learning model to predict a user's gaze.

FIG. 3 illustrates an example process 300 of training a machine-learning model to predict a user's gaze. In particular embodiments, the process 300 may start by feeding a plurality of images, such as image 302 into a machine-learning model. The image 302 may be processed to identify objects-of-interest 304. In particular embodiments, the machine-learning model may use input data as described herein to determine the objects-of-interest. In particular embodiments, the image 302 may correspond to a target practice virtual reality environment, where the user may aim for various targets 304i, 304j, 304k, 304l, by using objects 304a-304h. In particular embodiments, the machine-learning model may access a ground truth image 306 that comprises a plurality of identified determined focal points 308a-308m of the user's gaze. In particular embodiments, the ground truth image 306 may be generated through the use of eye tracking sensors and/or user confirmation. The plurality of determined focal points 308 within the ground truth image 306 may be represented by a highlighted green area. In particular embodiments, the machine-learning model may generate a predicted focal point image 310 comprising a plurality of predicted focal points 312a-312m. In particular embodiments, each of the predicted focal points 312 may be presented as a heat map that represents a probability of the predicted focal point 312 being at that location. In particular embodiments, the lighter shade of green may represent a low probability of where a predicted focal point 312 may be located. The red may represent a high probability of where a predicted focal point 312 may be located. The predicted focal points 312 may be compared to determined focal points 308 of a ground truth image 306. In particular embodiments, the machine-learning model may further be updated based on a comparison of the determined focal points 308 and the predicted focal points 312. Additionally, after a large number of samples, the predicted focal points 312 generated by the machine-learning model may be more accurate than the determined focal points 308. For instance, eye tracking sensors may not always be accurate. In particular embodiments, the machine-learning model may also use the input data to accurately determine a predicted focal point 312. In particular embodiments, the machine-learning model may determine the predicted focal points 312 based on the task the user is accomplishing. For instance, the objects 304a-304h may all have a higher probability the user is looking at them instead of the targets 304j-304l. As an example and not by way of limitation, the machine-learning model may determine that the user is completing a specific task of hitting the targets 304j-304l and will need an object 304a-304h in order to hit the targets 304j-304l. As such, the user may initially be more likely looking at objects 304a-304h. In particular embodiments, the machine-learning model may identify gaze sequences. The gaze sequence may be a pattern a user follows for looking at various rendered environments. As an example and not by way of limitation, a user may initially look at the largest object within a rendered environment and then the next largest object or the user may initially look at the closest object within a rendered environment and then the next closest object. For the target practice virtual reality environment, since the user is completing the task of hitting a target 304j-304l, the user may follow a specific gaze sequence. That is, the user may initially look at the objects 304a-304h to pick up to throw at a target 304j-304l. After the user selects an object, the user may direct their attention to a target 304j-304l. As such, the machine-learning model may predict that the objects 304a-304h may initially have a high probability of having the predicted focal point 312 being located at their respective locations and then the targets 304j-304l may have a high probability of having the predicted focal point 312 being located at their respective locations and the objects 304a-304h may have a reduced probability.

Figure 4:
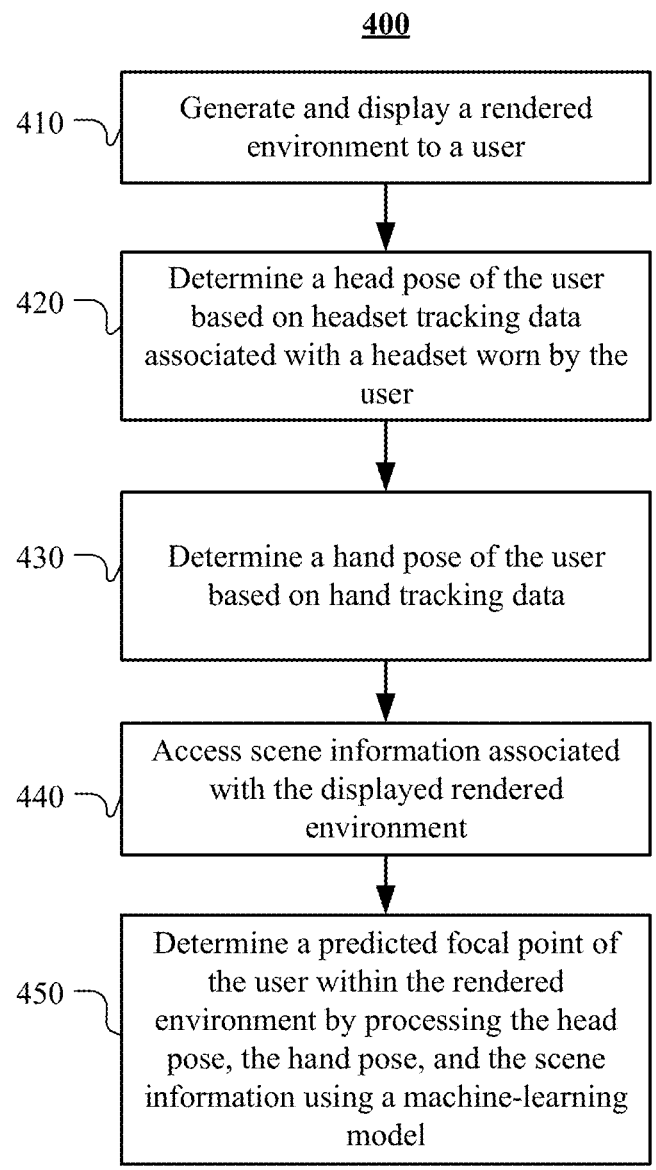
FIG. 4 illustrates an example method for determining a user's gaze using a machine-learning model.

FIG. 4 illustrates an example method 400 for determining a user's gaze using a machine-learning model. In particular embodiments, a virtual reality system may be used to determine a predicted focal point of where the user is looking. The method 400 may begin at step 410, where a computing system (e.g., virtual reality system) may generate and display a rendered environment to a user. At step 420, the computing system may determine a head pose of the user based on headset tracking data associated with a headset worn by the user. At step 430, the computing system may determine a hand pose of the user based on hand tracking data. At step 440, the computing system may access scene information associated with the displayed rendered environment. At step 450, the computing system may determine a predicted focal point of the user within the rendered environment by processing the head pose, the hand pose, and the scene information using a machine-learning model. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for determining a user's gaze using a machine-learning model, including the particular steps of the method of FIG. 4, this disclosure contemplates any suitable method of determining a user's gaze using a machine-learning model, including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Although this disclosure describes and illustrates processes in context of a virtual reality system performing various functions, a computing system (e.g., a server embodied as social-networking system 160 or third-party system 170) may handle the processing and send the results to a virtual reality system. In particular embodiments, a computing system may receive images and send the images to another computing system for processing.

Figure 5:
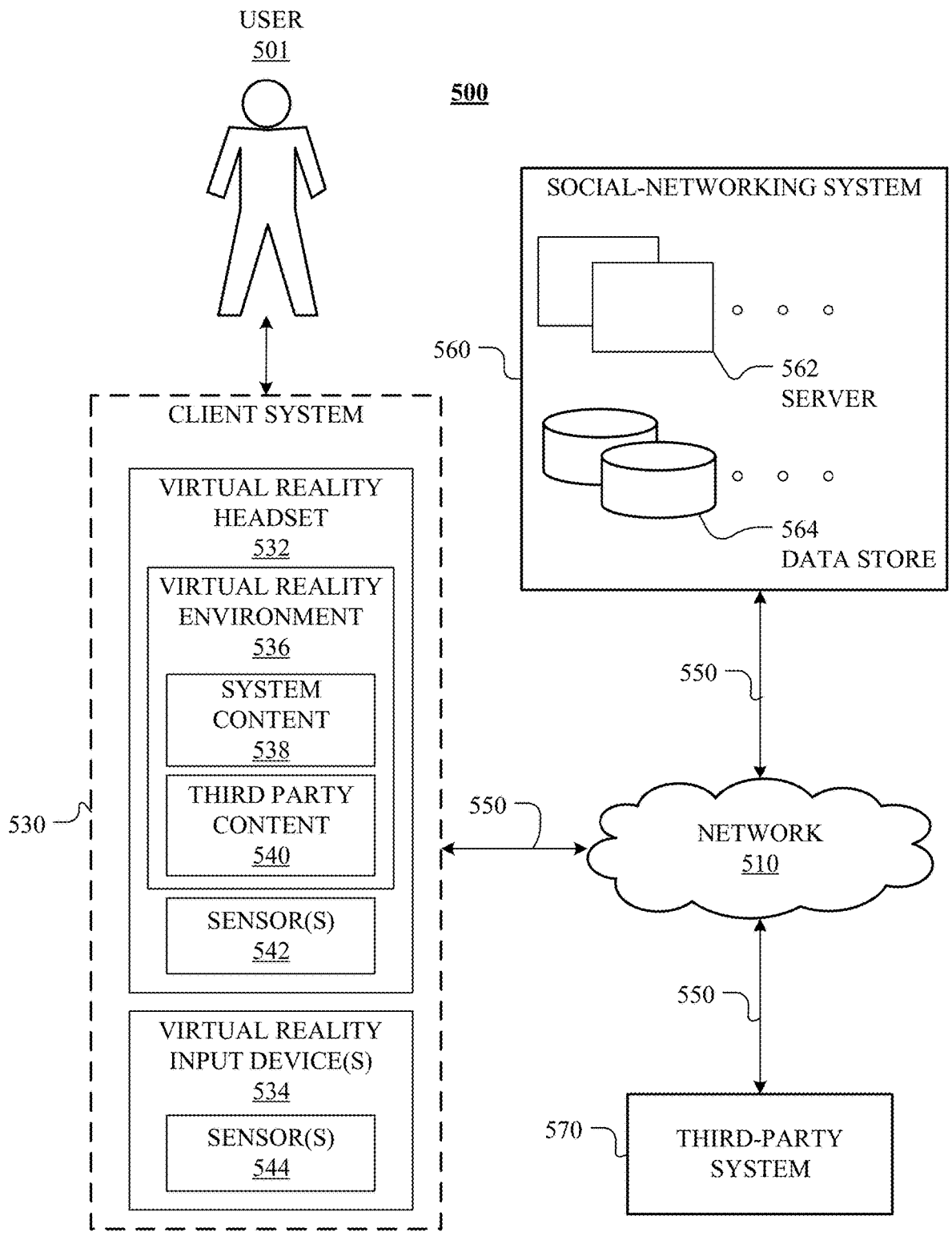
FIG. 5 illustrates an example network environment associated with a virtual reality system.

FIG. 5 illustrates an example network environment 500 associated with a virtual reality system. Network environment 500 includes a user 501 interacting with a client system 530, a social-networking system 560, and a third-party system 570 connected to each other by a network 510. Although FIG. 5 illustrates a particular arrangement of a user 501, a client system 530, a social-networking system 560, a third-party system 570, and a network 510, this disclosure contemplates any suitable arrangement of a user 501, a client system 530, a social-networking system 560, a third-party system 570, and a network 510. As an example and not by way of limitation, two or more of a user 501, a client system 530, a social-networking system 560, and a third-party system 570 may be connected to each other directly, bypassing a network 510. As another example, two or more of a client system 530, a social-networking system 560, and a third-party system 570 may be physically or logically co-located with each other in whole or in part. Moreover, although FIG. 5 illustrates a particular number of users 501, client systems 530, social-networking systems 560, third-party systems 570, and networks 510, this disclosure contemplates any suitable number of client systems 530, social-networking systems 560, third-party systems 570, and networks 510. As an example and not by way of limitation, network environment 500 may include multiple users 501, client systems 530, social-networking systems 560, third-party systems 570, and networks 510.

This disclosure contemplates any suitable network 510. As an example and not by way of limitation, one or more portions of a network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 510 may include one or more networks 510.

Links 550 may connect a client system 530, a social-networking system 560, and a third-party system 570 to a communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout a network environment 500. One or more first links 550 may differ in one or more respects from one or more second links 550.

In particular embodiments, a client system 530 may be an electronic device including hardware, software, or embedded logic components or a combination of two or more such components and capable of carrying out the appropriate functionalities implemented or supported by a client system 530. As an example and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 530. A client system 530 may enable a network user at a client system 530 to access a network 510. A client system 530 may enable its user to communicate with other users at other client systems 530. A client system 530 may generate a virtual reality environment for a user to interact with content.

In particular embodiments, a client system 530 may include a virtual reality (or augmented reality) headset 532, such as OCULUS RIFT and the like, and virtual reality input device(s) 534, such as a virtual reality controller. A user at a client system 530 may wear the virtual reality headset 532 and use the virtual reality input device(s) to interact with a virtual reality environment 536 generated by the virtual reality headset 532. Although not shown, a client system 530 may also include a separate processing computer and/or any other component of a virtual reality system. A virtual reality headset 532 may generate a virtual reality environment 536, which may include system content 538 (including but not limited to the operating system), such as software or firmware updates and also include third-party content 540, such as content from applications or dynamically downloaded from the Internet (e.g., web page content). A virtual reality headset 532 may include sensor(s) 542, such as accelerometers, gyroscopes, magnetometers to generate sensor data that tracks the location of the headset device 532. The headset 532 may also include eye trackers for tracking the position of the user's eyes or their viewing directions. The client system may use data from the sensor(s) 542 to determine velocity, orientation, and gravitation forces with respect to the headset. Virtual reality input device(s) 534 may include sensor(s) 544, such as accelerometers, gyroscopes, magnetometers, and touch sensors to generate sensor data that tracks the location of the input device 534 and the positions of the user's fingers. The client system 530 may make use of outside-in tracking, in which a tracking camera (not shown) is placed external to the virtual reality headset 532 and within the line of sight of the virtual reality headset 532. In outside-in tracking, the tracking camera may track the location of the virtual reality headset 532 (e.g., by tracking one or more infrared LED markers on the virtual reality headset 532). Alternatively or additionally, the client system 530 may make use of inside-out tracking, in which a tracking camera (not shown) may be placed on or within the virtual reality headset 532 itself. In inside-out tracking, the tracking camera may capture images around it in the real world and may use the changing perspectives of the real world to determine its own position in space.

Third-party content 540 may include a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at a client system 530 may enter a Uniform Resource Locator (URL) or other address directing a web browser to a particular server (such as server 562, or a server associated with a third-party system 570), and the web browser may generate a Hyper Text Transfer Protocol (HTTP) request and communicate the HTTP request to server. The server may accept the HTTP request and communicate to a client system 530 one or more Hyper Text Markup Language (HTML) files responsive to the HTTP request. The client system 530 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 560 may be a network-addressable computing system that can host an online social network. The social-networking system 560 may generate, store, receive, and send social-networking data, such as, for example, user-profile data, concept-profile data, social-graph information, or other suitable data related to the online social network. The social-networking system 560 may be accessed by the other components of network environment 500 either directly or via a network 510. As an example and not by way of limitation, a client system 530 may access the social-networking system 560 using a web browser of a third-party content 540, or a native application associated with the social-networking system 560 (e.g., a mobile social-networking application, a messaging application, another suitable application, or any combination thereof) either directly or via a network 510. In particular embodiments, the social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, the social-networking system 560 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplates any suitable types of databases. Particular embodiments may provide interfaces that enable a client system 530, a social-networking system 560, or a third-party system 570 to manage, retrieve, modify, add, or delete, the information stored in data store 564.

In particular embodiments, the social-networking system 560 may store one or more social graphs in one or more data stores 564. In particular embodiments, a social graph may include multiple nodes—which may include multiple user nodes (each corresponding to a particular user) or multiple concept nodes (each corresponding to a particular concept)—and multiple edges connecting the nodes. The social-networking system 560 may provide users of the online social network the ability to communicate and interact with other users. In particular embodiments, users may join the online social network via the social-networking system 560 and then add connections (e.g., relationships) to a number of other users of the social-networking system 560 whom they want to be connected to. Herein, the term "friend" may refer to any other user of the social-networking system 560 with whom a user has formed a connection, association, or relationship via the social-networking system 560.

In particular embodiments, the social-networking system 560 may provide users with the ability to take actions on various types of items or objects, supported by the social-networking system 560. As an example and not by way of limitation, the items and objects may include groups or social networks to which users of the social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 560 or by an external system of a third-party system 570, which is separate from the social-networking system 560 and coupled to the social-networking system 560 via a network 510.

In particular embodiments, the social-networking system 560 may be capable of linking a variety of entities. As an example and not by way of limitation, the social-networking system 560 may enable users to interact with each other as well as receive content from third-party systems 570 or other entities, or to allow users to interact with these entities through an application programming interfaces (API) or other communication channels.

In particular embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating the social-networking system 560. In particular embodiments, however, the social-networking system 560 and third-party systems 570 may operate in conjunction with each other to provide social-networking services to users of the social-networking system 560 or third-party systems 570. In this sense, the social-networking system 560 may provide a platform, or backbone, which other systems, such as third-party systems 570, may use to provide social-networking services and functionality to users across the Internet.

In particular embodiments, a third-party system 570 may include a third-party content object provider. A third-party content object provider may include one or more sources of content objects, which may be communicated to a client system 530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 560 also includes user-generated content objects, which may enhance a user's interactions with the social-networking system 560. User-generated content may include anything a user can add, upload, send, or "post" to the social-networking system 560. As an example and not by way of limitation, a user communicates posts to the social-networking system 560 from a client system 530. Posts may include data such as status updates or other textual data, location information, photos, videos, links, music or other similar data or media. Content may also be added to the social-networking system 560 by a third-party through a "communication channel," such as a newsfeed or stream.

In particular embodiments, the social-networking system 560 may include a variety of servers, sub-systems, programs, modules, logs, and data stores. In particular embodiments, the social-networking system 560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 560 may also include suitable components such as network interfaces, security mechanisms, load balancers, failover servers, management-and-network-operations consoles, other suitable components, or any suitable combination thereof. In particular embodiments, the social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 560 to one or more client systems 530 or one or more third-party systems 570 via a network 510. The web server may include a mail server or other messaging functionality for receiving and routing messages between the social-networking system 560 and one or more client systems 530. An API-request server may allow a third-party system 570 to access information from the social-networking system 560 by calling one or more APIs. An action logger may be used to receive communications from a web server about a user's actions on or off the social-networking system 560. In conjunction with the action log, a third-party-content-object log may be maintained of user exposures to third-party-content objects. A notification controller may provide information regarding content objects to a client system 530. Information may be pushed to a client system 530 as notifications, or information may be pulled from a client system 530 responsive to a request received from a client system 530. Authorization servers may be used to enforce one or more privacy settings of the users of the social-networking system 560. A privacy setting of a user determines how particular information associated with a user can be shared. The authorization server may allow users to opt in to or opt out of having their actions logged by the social-networking system 560 or shared with other systems (e.g., a third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

Figure 6:
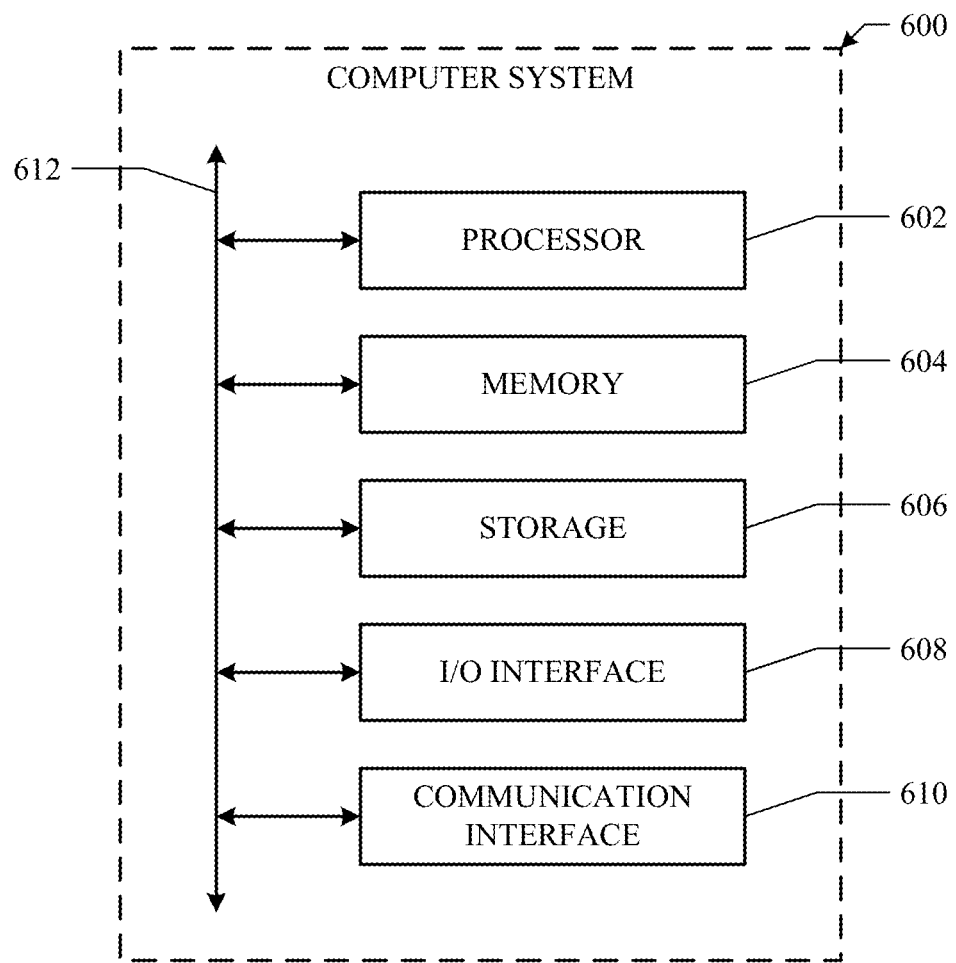
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   generating and displaying a rendered environment to a user, wherein the rendered environment is associated with an application that is related to a category;
   determining a head pose of the user based on headset tracking data associated with a headset worn by the user;
   determining a hand pose of the user based on hand tracking data;
   accessing scene information associated with the displayed rendered environment, wherein the scene information comprises the category related to the application; and
   determining a predicted focal point of the user within the rendered environment by processing the head pose, the hand pose, and the scene information using a machine-learning model.

2. The method of claim 1, further comprising:
   adjusting an image presented to the user by the computing system based on the predicted focal point of the user within the rendered environment.

3. The method of claim 1, wherein the head pose is determined with respect to the rendered environment.

4. The method of claim 1, wherein the hand pose is determined with respect to one of the rendered environment or the headset worn by the user.

5. The method of claim 1, wherein determining the hand pose of the user comprises:
   identifying a hand of the user based on one or more cameras coupled to the computing system analyzing a plurality of images comprising the hand of the user.

6. The method of claim 1, wherein the hand tracking data is associated with a device held or worn by a hand of the user.

7. The method of claim 6, further comprising:
   determining an action performed by the device held or worn by the hand of the user, and wherein determining the predicted focal point further comprises processing the action performed by the device held or worn by the hand of the user using the machine-learning model.

8. The method of claim 1, wherein the scene information includes color and depth data.

9. The method of claim 1, wherein the scene information comprises semantic information of one or more elements within the rendered environment.

10. The method of claim 1, wherein the predicted focal point is a three-dimensional coordinate within the rendered environment.

11. The method of claim 1, further comprising:
    generating a confidence map of one or more locations for the predicted focal point using the machine-learning model, wherein the confidence map assigns a probability of the predicted focal point being at each of the one or more locations, and wherein determining the predicted focal point comprises utilizing the confidence map.

12. The method of claim 1, wherein the predicted focal point is determined without eye tracking sensors.

13. The method of claim 1, wherein the rendered environment comprises one or more of an augmented reality environment, a virtual reality environment, or a mixed reality environment.

14. One or more computer-readable non-transitory storage media embodying software that is operable when executed to:
    generate and display a rendered environment to a user, wherein the rendered environment is associated with an application that is related to a category;
    determine a head pose of the user based on headset tracking data associated with a headset worn by the user;
    determine a hand pose of the user based on hand tracking data associated with a device held or worn by a hand of the user;
    access scene information associated with the displayed rendered environment, wherein the scene information comprises the category related to the application; and
    determine a predicted focal point of the user within the rendered environment by processing the head pose, the hand pose, and the scene information using a machine-learning model.

15. A system comprising: one or more processors; and a non-transitory memory coupled to the one or more processors comprising instructions executable by the one or more processors, the one or more processors operable when executing the instructions to:
    generate and display a rendered environment to a user, wherein the rendered environment is associated with an application that is related to a category;
    determine a head pose of the user based on headset tracking data associated with a headset worn by the user;
    determine a hand pose of the user based on hand tracking data associated with a device held or worn by a hand of the user;
    access scene information associated with the displayed rendered environment, wherein the scene information comprises the category related to the application; and
    determine a predicted focal point of the user within the rendered environment by processing the head pose, the hand pose, and the scene information using a machine-learning model.

16. The system of claim 15, wherein the one or more processors are further operable when executing the instructions to:
    adjust an image presented to the user by the computing system based on the predicted focal point of the user within the rendered environment.

17. The system of claim 15, wherein the head pose is determined with respect to the rendered environment.

18. The system of claim 15, wherein the hand pose is determined with respect to one of the rendered environment or the headset worn by the user.

19. The system of claim 15, wherein the one or more processors are further operable when executing the instructions to:
 identify a hand of the user based on one or more cameras coupled to the computing system analyzing a plurality of images comprising the hand of the user.

20. The system of claim 15, wherein the hand tracking data is associated with a device held or worn by a hand of the user.

\* \* \* \* \*